United States Patent [19]

Younes

[11] Patent Number: 5,470,822
[45] Date of Patent: Nov. 28, 1995

[54] LOW-TOXICITY INVERT EMULSION FLUIDS FOR WELL DRILLING

[75] Inventor: Usama E. Younes, West Chester, Pa.

[73] Assignee: Arco Chemical Technology, L.P., Greenville, Del.

[21] Appl. No.: 245,329

[22] Filed: May 18, 1994

[51] Int. Cl.$^6$ .................................................. C09K 7/06
[52] U.S. Cl. .................................. 507/133; 507/136
[58] Field of Search ........................... 507/133, 136

[56] References Cited

U.S. PATENT DOCUMENTS

| | | | |
|---|---|---|---|
| 2,661,334 | 12/1953 | Lummus | 507/136 |
| 2,797,196 | 6/1957 | Dunn et al. | 507/136 |
| 2,997,440 | 8/1961 | Anderson | 507/136 |
| 3,006,845 | 10/1961 | Van Dyke et al. | 507/136 |
| 3,050,141 | 8/1962 | Lummus et al. | 507/136 |
| 3,125,517 | 3/1964 | Voda | 507/133 |
| 3,127,343 | 3/1964 | Reddie et al. | 507/136 |
| 3,236,769 | 2/1966 | Burdyn et al. | 507/133 |
| 3,284,352 | 11/1966 | Burdyn et al. | 507/133 |
| 3,396,105 | 8/1968 | Burdyn et al. | 507/133 |
| 3,461,068 | 8/1969 | Peacock | 507/136 |
| 3,654,370 | 4/1972 | Yeakey | 260/584 |
| 3,810,836 | 5/1974 | Norton | 507/136 |
| 3,979,304 | 9/1976 | Fischer et al. | 507/136 |
| 3,979,305 | 9/1976 | Fischer et al. | 507/136 |
| 4,230,586 | 10/1980 | Bretz et al. | 507/133 |
| 4,776,966 | 10/1988 | Baker | 252/8.515 |
| 5,057,234 | 10/1991 | Bland et al. | 252/8.51 |
| 5,141,920 | 8/1992 | Bland et al. | 507/136 |
| 5,260,268 | 11/1993 | Forsberg et al. | 507/133 |

FOREIGN PATENT DOCUMENTS 2006009  6/1990  Canada.

OTHER PUBLICATIONS

Bennet, R. B., *Journal of Petroleum Technology* "New Drilling Fluid Technology—Mineral Oil Mud" pp. 975–981 (1984).
Boyd, et al., *Journal of Petroleum Technology* "New Base Oil Used in Low–Toxicity Oil Muds" pp. 137–142 (1985).

Primary Examiner—Philip Tucker
Attorney, Agent, or Firm—Dennis M. Kozak

[57] ABSTRACT

Low-toxicity invert emulsion fluids for well drilling are disclosed. The fluids comprise a non-hydrocarbon, non-mineral oil continuous phase and a dispersed aqueous phase. The continuous phase materials of the invention pass the 48 hour, LC50 *Mysidopsis bahia* bioassay test protocol.

12 Claims, No Drawings

LOW-TOXICITY INVERT EMULSION FLUIDS FOR WELL DRILLING

FIELD OF THE INVENTION

This invention relates to well working fluids and, more specifically, to the type of well working fluids classified as invert emulsion fluids. The invert emulsion fluids of this invention comprise non-hydrocarbon, non-mineral oil continuous phases and aqueous dispersed phases. The non-hydrocarbon, non-mineral oil continuous phase materials of the invention exhibit low toxicity as measured by bioassays of mysid shrimp and thus facilitate the formulation of drilling muds which exhibit low toxicities and meet EPA discharge criteria.

BACKGROUND OF THE INVENTION

In oil-based fluids, the continuous or external phase is typically diesel oil. When immiscible water is emulsified and suspended as the dispersed or internal phase, the fluid is typically referred to as an invert emulsion fluid. True oil-based invert emulsion fluids are formed by the emulsification of brine water. Excellent descriptions of oil-based invert emulsion fluids are found in the following two articles: (1) R. B. Bennet, *Journal of Petroleum Technology* "New Drilling Fluid Technology—Mineral Oil Mud" pp 975–981 (1984), and (2) P. A. Boyd, et al. *Journal of Petroleum Technology* "New Base Oil Used in Low—Toxicity Oil Muds" pp 137–142 (1985).

Oil-based invert emulsion type fluids are widely used in a diversity of well working applications. They are ideally suited to deep wells, of high temperature and pressure. They provide the highest probability of drilling holes in areas of known instability. They prevent dissolution and serious erosion when drilling water-soluble formations. And, they also exhibit superior lubricity qualities in directional and horizontal wells as compared to water-based fluids.

Despite the many advantages of oil-based invert emulsion muds, their use has been limited by environmental concerns. Prior art invert emulsion oil muds tend to be toxic to marine life due to their high concentrations of aromatics. Environmental regulations for offshore drilling fluids now require bioassays to determine whether the fluid meets established toxicity limits for discharge into the seas. The bioassay protocol concerns the toxicity of the drilling fluids to mysid shrimp, *Mysidopsis bahia*, which is indigenous to warm bay waters in the Gulf of Mexico. The protocol is in accordance with Federal Register, Vol. 50, No. 165, pages 34632–34636.

The advantages of using invert emulsion oil muds in difficult drilling situations, and the environmental concerns associated with their use, has led researchers to pursue the development of non-hydrocarbon oil muds. Essentially this pursuit has involved the replacement of diesel oil with more environmentally acceptable liquids. One such replacement liquid which has found commercial acceptance is mineral oil, a low polynuclear aromatic (LPNA) oil. The problem with mineral oil-based muds is that even though mineral oil is more environmentally acceptable than diesel oil, it is still an oil. The regulations governing the amount of oil allowed to be discharged into the sea along with drilled cuttings are becoming even more stringent leading researchers to pursue synthetic materials to replace the use of all petroleum based oils, including mineral oil.

Ideal oil replacement liquids should cause low or no sheen or discoloration of surface water, have low toxicity to marine and freshwater organisms, have a high flashpoint range to assure safe operation of the system, and be capable of forming a good, stable, invert emulsion drilling mud.

Suitable non-oil replacement liquids are taught in U.S. Pat. Nos. 5,057,234 and 5,141,920 and include polypropylene glycols, polypropylene glycol ethers, and propylene oxide polymeric adducts of alcohols or mixtures of alcohols. The present invention provides additional non-oil replacement liquids for invert emulsion fluids.

The invert emulsion fluids of this invention comprise non-hydrocarbon, non-mineral oil continuous phase materials which have high flashpoints and meet the stringent EPA toxicity limits for discharge into sea water as measured by the bioassays of mysid shrimp.

SUMMARY OF THE INVENTION:

According to this invention there is provided a low-toxicity invert emulsion fluid for well drilling comprising a non-hydrocarbon, non-mineral oil continuous phase, an aqueous dispersed phase, at least one weight additive and at least one emulsifier. The continuous phase comprises a polymer or a blend of polymers, each polymer having a polyoxyalkylene core having 2 to 3 end groups. Each end group is selected from the group consisting of hydroxyl, $C_6$–$C_{30}$ acyloxy, and $C_6$–$C_{30}$ alkanamido, with the proviso that 50% or more of the total number of end groups must be selected from the group consisting of $C_6$–$C_{30}$ acyloxy, and $C_6$–$C_{30}$ alkanamido. The polyoxyalkylene core has a number average molecular weight within the range of from about 150 to about 1,500.

DETAILED DESCRIPTION OF THE INVENTION

The continuous phase material of this invention is comprised of a polymer or polymer blend. Preferably, the polymer is the reaction product of an acid or acid derivative with a polyol. In one embodiment of this invention, the continuous phase comprises an ester-terminated polymer prepared conventionally by the esterification of an acid or acid derivative (anhydride, amide or an acid chloride) with a low molecular weight polyether polyol. Moreover, any conventional esterification catalyst can be employed in the polymerization reaction. One suitable catalyst used in the examples was a 50% aqueous hypophorous acid solution. Alternatively, the ester-terminated polymer can be prepared by the transesterification of a suitable ester with a polyether polyol. In another embodiment, an amine terminated polyether can be substituted for the polyether polyol.

Any suitable $C_6$ to $C_{30}$ acid can be used to prepare the continuous phase polymeric material. Particularly suitable for use are $C_6$ to $C_{22}$ fatty acids and mixtures of fatty acids. Suitable acids may be saturated or unsaturated, naturally occurring or synthetic, cyclic or straight or branched chain. Examples of $C_6$ to $C_{30}$ acids suitable for use in this invention include: hexanoic acid, 2-ethylhexanoic, stearic, oleic, caprylic, capric, palmitic, margaric, linolenic, lauric, myristic, soya, 2-phenylbutyric, eicosanoic, and the like, and their mixtures, such as coconut and tallow. Likewise, anhydrides, amides or acid chlorides of any of the above acids can be employed to produce the polymeric continuous phase materials of the invention.

Suitable for use as the polyether polyol are alkylene oxide adducts of starters which are typically diols, triols, or water.

Suitable alkylene oxides include ethylene, propylene, and butylene. Particularly suitable and used in the Examples are the series of propylene oxide adducts of diol starters designated ARCOL® PPG-425, PPG-725, and PPG-1025 commercially available from ARCO Chemical Company. Polyether polyols suitable for use in the practice of the invention will have number average molecular weights of from about 150 to about 1500. The mole ratio of acid or acid derivative to polyether polyol employed to produce the polymeric continuous phase materials of this invention will be sufficient to provide requisite level of end capping in the resultant polymer as discussed above.

If one desires to prepare the ester-terminated polymer by conventional transesterification, a suitable alkyl ester derived from a $C_6$–$C_{30}$ acid or mixture thereof can be used. Suitable alkyl (preferably methyl, ethyl and propyl) esters include methyl caprylate, methyl caprate, methyl laurate, methyl myristate, methyl palmitate, methyl stearate, methyl oleate, methyl linoleate, methyl palm kernalate, ethyl octanoate, propyl dodecanoate, and the like, and their mixtures, such as methyl coconate and methyl tallowate. Any conventional transesterification catalyst can be employed in art recognized amounts, suitable catalysts include alkali metal oxides, hydroxides, or alkoxides.

A continuous phase polymer suitable for use in the invention can be prepared by first aminating any suitable polyether polyol. One conventional method involves the treatment of the polyol with ammonia and hydrogen over a catalyst prepared by the reduction of a mixture of nickel, copper and chromium. U.S. Pat. No. 3,654,370, incorporated by reference herein, describes this method in detail. The amine-terminated polyether is then reacted with an acid or acid derivative.

The water used in the dispersed aqueous phase is preferably in the form of a brine solution containing from about 100 to about 350,000 parts per million of metal ions. Brines suitable for use to form the dispersed phase of the emulsions of the invention will contain from about 10 to about 30% by weight dissolved salt content. Typically, the salt may be calcium, sodium, or potassium chlorides or other water soluble salts.

The ratio of brine to polymer in the emulsions of the invention should generally provide as high a brine content as possible while still maintaining a stable emulsion. Polymer to brine ratios in the range of from about 90:10 to 50:50 are suitable.

In addition to the polymeric continuous and the dispersed aqueous phases, employed in muds in treatment amounts of from about 50 to about 90 and from about 10 to about 50 percent by volume, respectively, other conventional mud additives can be employed in art recognized amounts. Other additives, their functions and mud treatment amounts include: calcium chloride for osmotic control (12–48 lbs./bbl.); fatty acids and/or naphthenic acids for soap formation, viscosity and emulsification (1–15 lbs./bbl.); lime for calcium soap formation (1–10 lbs./bbl.); calcium alkylaryl sulfonate for emulsification (1–5 lbs./bbl.); amine-treated lignite for viscosity and filtration control (1–3 lbs./bbl.); organophilic clay for viscosity and gel strength (0.5–4 lbs./bbl.); and barite weighting agent for pressure control (up to 700 lbs./bbl.).

The following examples are illustrative of the invention and not intended to limit the scope thereof.

EXAMPLE 1

This example demonstrates the preparation of a polymer suitable for use as a non-hydrocarbon, non-mineral oil continuous phase of an invert emulsion fluid of the invention.

Into a reaction vessel equipped with a nitrogen sparge were added, with stirring, about 600 grams of ARCOL® PPG-425 Performance Polyether Polyol (ARCO Chemical Company) and about 968 grams of Emery® 610 Soya Fatty Acid (Henkel Corporation). The mixture was heated to about 230° C. for about 20 hours and then water was removed by condensation. The resulting polymer was found to contain 16.2% free acid. After steam stripping under vacuum at about 210° C. a (polypropylene glycol disoyate) ester terminated poly(oxypropylene) polymer having an acidity of 0.8% was recovered.

EXAMPLE 2

This example demonstrates the preparation of a polymer suitable for use as a non-hydrocarbon, non-mineral continuous phase of an invert emulsion fluid according to the invention.

Into a reaction vessel equipped with a nitrogen sparge were added, with stirring, about 1600 grams of ARCOL PPG-425 Performance Polyether Polyol, about 1308 grams of Emery® 658 Caprylic-Capric Acid, and about 3.3 grams of a 50% aqueous solution of hypophosphorus acid catalyst. After heating at about 250° C. for about 6 hours, the resulting polymer, an ester-terminated polyoxypropylene polymer (polypropylene glycol caprylate-caprate), was steam stripped and found to have a final acidity of 0.21%. Following Table 1 shows several additional polymers which were prepared using substantially the procedure set forth in Example 2, but using different polyols and acids. All of the polymers are of the invention.

TABLE I

| | Non-hydrocarbon, Non-mineral oil continuous or external phase materials | | | | |
|---|---|---|---|---|---|
| EXAMPLE NO. | POLYOL | AMOUNT OF POLYOL (g) | ACID | AMOUNT OF ACID (g) | FINAL % ACIDITY |
| 1 | PPG-425[1] | 600 | SOYA[3] | 967.6 | 0.8 |
| 2 | PPG-425[1] | 1600 | CAPRYLIC-CAPRIC[4] | 1308 | 0.26 |
| 3 | PPG-425[1] | 801 | CAPRYLIC[5] | 635 | Not measured |
| 4 | PPG-425[1] | 1200 | CAPRIC[6] | 1137 | 0.21 |
| 5 | PPG-425[1] | 601 | COCONUT[7] | 721 | 0.11 |
| 6 | PPG-725[2] | 2280 | CAPRYLIC-CAPRIC[6] | 981 | 0.26 |
| 7 | PPG-425[1] | 1488 | COCONUT[7] | 1349 | 0.2 |

TABLE I-continued

Non-hydrocarbon, Non-mineral oil continuous or external phase materials

| EXAMPLE NO. | POLYOL | AMOUNT OF POLYOL (g) | ACID | AMOUNT OF ACID (g) | FINAL % ACIDITY |
|---|---|---|---|---|---|
| 8 | PPG-425[1] | 1700 | COCONUT[7] | 1285 | 0.13 |
| 9 | PPG-425[1] | 1700 | COCONUT[7] | 1028 | Not measured |

[1]ARCOL ® PPG-425 Performance Polyether Polyol (MW~425)
[2]ARCOL ® PPG-725 Performance Polyether Polyol (MW~760)
[3]EMERY ® 610 Soya Fatty Acid
[4]EMERY ® 658 Caprylic -- Capric Acid
[5]EMERY ® 657 Caprylic Acid
[6]EMERY ® 659 Capric Acid
[7]EMERY ® 622 Coconut Fatty Acid To determine the toxicity levels of the above continuous phase polymeric materials, toxicity testing was separately conducted on the first eight materials. Test results are based on the concentration of the polymeric material which is lethal to 50% of the live test organisms after 48 hours of continuous exposure. Four to six day old mysid shrimp (*Mysidopsis bahia*) were the test organisms used in the testing. The calculated concentration that caused 50% mortality (LC50) to the shrimp at the end of the test must be greater than 30,000 ppm to meet EPA discharge requirements.

For control purposes ARCOL® PPG-425 Performance Polyether Polyol, ARCOL® PPG-725 Performance Polyether Polyol, EMERY® 658 Caprylic-Capric Acid, and EMERY® 2209 Methyl Caprylate-Caprate, all suitable starting components for producing continuous phase polymeric materials of this invention, were also separately subjected to toxicity testing. Toxicity test results are shown in following Table II.

TABLE II

Mysidopsis bahia 48 hr. LC50 data

| SAMPLE | 48 hr. LC50 - (ppm) | EPA Toxicity Criteria |
|---|---|---|
| ARCOL ® PPG-425 | <20,000 | Fail |
| ARCOL ® PPG-725 | <30,000 | Fail |
| EMERY ® 658 Acid | <20,000 | Fail |
| EMERY ® 2209 Acid Methyl Ester | <20,000 | Fail |
| Polymer (Example 1) | >1,000,000 | Pass |
| Polymer (Example 2) | >1,000,000 | Pass |
| Polymer (Example 3) | >1,000,000 | Pass |
| Polymer (Example 4) | >1,000,000 | Pass |
| Polymer (Example 5) | >1,000,000 | Pass |
| Polymer (Example 6) | >600,000 | Pass |
| Polymer (Example 7) | >1,000,000 | Pass |
| Polymer (Example 8) | >300,000 | Pass |

Moreover, the polymer of Example 1 was formulated into a low toxicity invert emulsion mud and the mud was subjected to the 96 hr. toxicity test and passed with a 96 hr. LC50>250,000 ppm.

Because a critical factor in using non-toxic oil-based muds is the flashpoint of the system, the flashpoints of the polymers of Examples 1, 4, and 5 were measured and found to be 460°, 430° and 385° F., respectively. In mud preparation it is generally accepted that the greater the temperature at which the continuous phase material's flashpoint is reached, the higher the operational temperature of the mud. Moreover, the higher the flashpoint the less volatile components which could ignite, thus making use of the system safer.

The novel polymeric continuous phase materials of this invention can be used to produce invert emulsion drilling muds using conventional materials and formulation procedures. For example a 70/30 polymer/water ratio fluid at 9, 11 and 13 pounds per gallon (ppg) mud weights can be prepared by blending until a stable emulsion results, the components of the following typical formulations shown in Table III.

TABLE III

70/30 Polymer/Water Ratio Muds

| Material | Mud #1 9 ppg | Mud #2 11 ppg | Mud #3 13 ppg |
|---|---|---|---|
| Polymer of Ex. 2 | .63 bbl | .58 bbl | .53 bbl |
| 25% CaCl$_2$ Brine | .29 bbl | .27 bbl | .25 bbl |
| Wetting Agent | 2 ppb | 2 ppb | 2 ppb |
| Emulsifier | 5 ppb | 5 ppb | 5 ppb |
| Lime | 3 ppb | 3 ppb | 3 ppb |
| Organophilic Clay | 5 ppb | 4 ppb | 2 ppb |
| Barite | 58 ppb | 166 ppb | 276 ppb |

Moreover, a 80/20 polymer/water ratio invert emulsion mud is prepared by blending the following materials until a stable emulsion is formed as shown in Table IV.

TABLE IV

80/20 Polymer/Water Ratio Muds

| Material | Mud (10 ppg) |
|---|---|
| Polymer of Ex. 5 | 0.68 bbl |
| Water | 0.165 bbl |
| CaCl$_2$ (82%) | 25.4 lbs |
| Primary emulsifier | 1 lb |
| Secondary emulsifier | 9 lbs |
| HTHD filtration reducer | 8 lbs |
| Gellant | 9 lbs |
| Lime | 2 lbs |
| Barite | 104 lbs |

What is claimed is:

1. A low toxicity invert emulsion drilling fluid comprising:

A. a non-hydrocarbon, non-mineral oil continuous phase comprising a polymer or a blend of polymers, each polymer having a polyoxyalkylene core having 2 to 3 end groups each end group selected from the group consisting of hydroxyl, $C_6$–$C_{30}$ acyloxy, and $C_6$–$C_{30}$ alkanamido, with the proviso that 50% or more of the total end groups must be selected from the group consisting of $C_6$–$C_{30}$ acyloxy and $C_6$–$C_{30}$ alkanamido, and in which the polyoxyalkylene core has a number average molecular weight within the range of from about 150 to about 1,500;

B. a dispersed aqueous phase;

C. at least one weight additive; and,

D. at least one emulsifier.

2. The drilling fluid of claim 1 in which the continuous phase and the dispersed phase are employed in amounts of from about 50 to about 90 and from about 10 to about 50 percent by volume, respectively.

3. The drilling fluid of claim 1 in which each end group is selected from the group consisting of hydroxyl, $C_6$–$C_{22}$ acyloxy, and $C_6$–$C_{22}$ alkanamido.

4. The drilling fluid of claim 1 in which said polymer is an ester-terminated poly(oxyalkylene) polymer.

5. The drilling fluid of claim 4 in which said polymer is an ester-terminated poly(oxypropylene) polymer.

6. The drilling fluid of claim 4 in which said polymer is an ester-terminated poly(oxyethylene-oxypropylene) polymer.

7. The drilling fluid of claim 1 in which said polymer is an amide-terminated poly(oxyalkylene) polymer.

8. The drilling fluid of claim 7 in which said polymer is an amide-terminated poly(oxypropylene) polymer.

9. The drilling fluid of claim 7 in which said polymer is an amide-terminated poly(oxyethylene-oxypropylene) polymer.

10. The drilling fluid of claim 4 in which said ester-terminated polymer is derived from the reaction of a poly(oxyalkylene) polyol with a $C_6$–$C_{22}$ fatty acid or fatty acid derivative selected from the group consisting of anhydride, amide and acid chloride.

11. The drilling fluid of claim 7 in which said ester-terminated polymer is derived from the reaction of an amine terminated polyether polyol with a $C_6$–$C_{22}$ fatty acid or fatty acid derivative selected from the group consisting of anhydride, amide and acid chloride.

12. The drilling fluid of claim 1 in which said continuous phase polymer or blend of polymers passes the 48 hour, LC50 *Mysidopsis bahia* bioassay test protocol.

* * * * *